United States Patent
Song et al.

(10) Patent No.: US 12,037,518 B2
(45) Date of Patent: Jul. 16, 2024

(54) PRESSURE-SENSITIVE ADHESIVE COMPOSITION, PRESSURE-SENSITIVE ADHESIVE LAYER COMPRISING SAME, AND FOLDABLE DISPLAY INCLUDING SAME PRESSURE-SENSITIVE ADHESIVE LAYER

(71) Applicant: LG CHEM, LTD., Seoul (KR)

(72) Inventors: Hee Song, Daejeon (KR); Hyon Gyu Park, Daejeon (KR); Hyun Cheol Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 559 days.

(21) Appl. No.: 17/272,150

(22) PCT Filed: Dec. 24, 2019

(86) PCT No.: PCT/KR2019/018401
§ 371 (c)(1),
(2) Date: Feb. 26, 2021

(87) PCT Pub. No.: WO2020/141789
PCT Pub. Date: Jul. 9, 2020

(65) Prior Publication Data
US 2021/0340414 A1 Nov. 4, 2021

(30) Foreign Application Priority Data

Jan. 4, 2019 (KR) .................. 10-2019-0001268

(51) Int. Cl.
*C09J 133/08* (2006.01)
*C09J 7/38* (2018.01)
(Continued)

(52) U.S. Cl.
CPC ............. *C09J 133/08* (2013.01); *C09J 7/385* (2018.01); *C09J 11/06* (2013.01); *B32B 7/12* (2013.01); *B32B 2457/20* (2013.01); *C08K 5/07* (2013.01); *C08K 5/41* (2013.01); *C09J 2301/312* (2020.08); *C09K 2323/05* (2020.08);
(Continued)

(58) Field of Classification Search
CPC ... C09J 133/08; C09J 133/066; C08K 5/0025; C08K 5/56; C08K 5/05; C08K 5/07
See application file for complete search history.

(56) References Cited

U.S. PATENT DOCUMENTS 7,863,360 B2    1/2011   Cho et al.
10,586,941 B2   3/2020   Lee et al.
(Continued)

FOREIGN PATENT DOCUMENTS

EP   2302012 A2   3/2011
EP   2527416 A2   11/2012
(Continued)

OTHER PUBLICATIONS

International Search Report and Written Opinion issued for International Application No. PCT/KR2019/018401 on Jun. 19, 2020, 9 pages.

*Primary Examiner* — Eli D. Strah
(74) *Attorney, Agent, or Firm* — ROTHWELL, FIGG, ERNST & MANBECK, P.C.

(57) ABSTRACT

Provided are an adhesive composition, an adhesive layer comprising the same and a foldable display comprising the same.

10 Claims, 1 Drawing Sheet

```
┌─────────────────┐
│                 │
│      101        │
│                 │
├─────────────────┤
│                 │
│      102        │
│                 │
├─────────────────┤
│                 │
│      103        │
│                 │
└─────────────────┘
```

(51) Int. Cl.
*C09J 11/06* (2006.01)
*B32B 7/12* (2006.01)
*C08K 5/07* (2006.01)
*C08K 5/41* (2006.01)

(52) U.S. Cl.
CPC .. *C09K 2323/055* (2020.08); *C09K 2323/057* (2020.08); *C09K 2323/06* (2020.08)

(56) References Cited

U.S. PATENT DOCUMENTS

| | | | |
|---|---|---|---|
| 10,920,112 B2 | 2/2021 | Park et al. | |
| 2003/0178124 A1 | 9/2003 | Mikami et al. | |
| 2006/0279922 A1* | 12/2006 | Cho | C09J 133/14 |
| | | | 361/679.01 |
| 2006/0279923 A1 | 12/2006 | Kim et al. | |
| 2007/0191517 A1 | 8/2007 | Chun et al. | |
| 2012/0157611 A1* | 6/2012 | Katami | C09J 7/10 |
| | | | 524/558 |
| 2013/0266805 A1 | 10/2013 | Kataoka et al. | |
| 2015/0024198 A1 | 1/2015 | Yamagata et al. | |
| 2017/0200915 A1* | 7/2017 | Lee | H10K 59/40 |
| 2018/0031746 A1 | 2/2018 | Ueno et al. | |

FOREIGN PATENT DOCUMENTS

| | | |
|---|---|---|
| JP | 2006-299283 A | 11/2006 |
| JP | 2013-216756 A | 10/2013 |
| JP | 2013-216769 A | 10/2013 |
| JP | 2017-126061 A | 7/2017 |
| JP | 2018-045213 A | 3/2018 |
| JP | 2018-123330 A | 8/2018 |
| JP | 2019-527745 A | 10/2019 |
| KR | 10-2006-0128659 A | 12/2006 |
| KR | 10-2007-0021761 A | 2/2007 |
| KR | 10-2010-0100809 A | 9/2010 |
| KR | 10-2016-0035182 A | 3/2016 |
| KR | 10-2017-0061007 A | 6/2017 |
| KR | 10-2017-0097851 A | 8/2017 |
| KR | 10-2017-0117042 A | 10/2017 |
| TW | I323738 B | 4/2010 |
| TW | 201402759 A | 1/2014 |

* cited by examiner

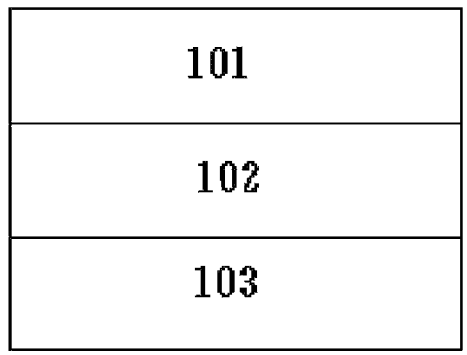

PRESSURE-SENSITIVE ADHESIVE COMPOSITION, PRESSURE-SENSITIVE ADHESIVE LAYER COMPRISING SAME, AND FOLDABLE DISPLAY INCLUDING SAME PRESSURE-SENSITIVE ADHESIVE LAYER

This application is a 35 U.S.C. 371 National Phase Entry application from PCT/KR2019/018401 filed on Dec. 24, 2019 and designating the United States and claims priority to and the benefit of Korean Patent Application No. 10-2019-0001268, filed with the Korean Intellectual Property Office on Jan. 4, 2019, the entire contents of which are incorporated herein by reference.

TECHNICAL FIELD

This application relates to an adhesive composition, an adhesive layer comprising the same and a foldable display comprising the same.

BACKGROUND OF THE INVENTION

Recently, portable terminals such as wireless terminals, personal digital assistants (PDAs), portable multimedia players (PMPs) and electronic organizers have become smaller in size for improved portability.

However, users want to receive information from various contents such as text information, videos and games, through the screens of portable terminals, and thus the size of display screens needs to be enlarged or widened. However, reducing the size of portable terminals leads to reducing the size of display screens, so there is a limitation when attempting to satisfy both requirements.

Conventional display devices use unbreakable displays not allowing for deformation, but curved displays, bended displays, foldable displays, rollable displays and the like have been developed in order to overcome this limitation.

Currently, only bended displays are at the commercialization stage in the mobile field, but the adoption of foldable displays in the mobile field is expected to be enthusiastic. In addition, remarkable development is underway in the electric field using pOLED.

In order to realize thinning of display devices and minimize the lifting of foldable displays upon folding, an on-cell type touch (touch of encapsulation, TOE), in which a touch screen is directly deposited on an encapsulation layer (Encap) of a panel, has arisen. In order to realize high resolution of touch pixels and support multi-touch, the TOE should react sensitively to changes in the capacitance of the surface, and requires an adhesive layer with high permittivity for this purpose.

In addition to the need for an adhesive layer with high permittivity, foldable displays should satisfy reliability requirements for folding in various environments, and there is a need to develop an adhesive agent that helps prevent lifting, peeling and bubble generation.

BRIEF SUMMARY OF THE INVENTION

The present application is directed to providing an adhesive composition, an adhesive layer comprising the same and a foldable display comprising the same.

One embodiment of the present application provides an adhesive composition comprising: a (meth)acrylate resin having a glass transition temperature (Tg) of −70° C. or lower; an epoxy crosslinking agent; a metal salt; and acetylacetone (acac).

Another embodiment of the present application provides an adhesive layer comprising the adhesive composition according to the present application or a cured product thereof, wherein the adhesive layer has a storage modulus satisfying the following Equations 1 and 2:

$$1\times10^5 \leq G1' \leq 1\times10^6 \qquad \text{[Equation 1]}$$

$$1\times10^4 \leq G2' \leq 1\times10^5 \qquad \text{[Equation 2]}$$

wherein G1' is a storage modulus (Pa) at −30° C.; and G2' is a storage modulus (Pa) at 60° C.

Yet another embodiment of the present application provides a foldable display comprising: the adhesive layer; and a flexible substrate provided on one surface of the adhesive layer.

The adhesive composition according to one embodiment of the present application comprises acetylacetone having a greater interaction with metal ions than epoxy, thereby preventing the decrease in the extent of curing of the adhesive layer and improving storage stability when stored as a mixture comprising the adhesive composition.

The adhesive layer according to another embodiment of the present application exhibits increased internal ionic conductivity and thus increased permittivity by adding a metal salt to an adhesive layer having a reduced modulus in order to realize folding characteristics without causing damage to a display.

Accordingly, the adhesive and folding properties of the adhesive agent used in conventional foldable displays can be maintained, the permittivity can be increased, and a high resolution and a touch with quick response can thus be realized in a TOE-type structure.

BRIEF DESCRIPTION OF DRAWINGS

FIG. 1 is a side view showing an adhesive layer according to one embodiment of the present application.

REFERENCE NUMERAL

101: Release film
102: Adhesive layer
103: Release film

DETAILED DESCRIPTION OF THE INVENTION

Hereinafter, the present specification will be described in more detail.

Hereinafter, specific embodiments of the present invention will be described in more detail with reference to the attached drawings such that those skilled in the art to which the present invention pertains can easily implement the embodiments. However, the present invention can be implemented in various forms, and is not limited to the embodiments described herein.

In the present specification, it will be understood that, when a portion is referred to as "including" one element, the portion may further comprise another element, and does not preclude the presence thereof unless clearly indicated otherwise.

One embodiment of the present application provides an adhesive composition comprising: a (meth)acrylate resin having a glass transition temperature (Tg) of −70° C. or lower; an epoxy crosslinking agent; a metal salt; and acetylacetone (acac).

The adhesive composition according to one embodiment of the present application comprises acetylacetone having a greater interaction with metal ions than epoxy, thereby preventing the decrease in the extent of curing of the adhesive layer and improving storage stability when stored as a mixture comprising the adhesive composition.

In addition, the adhesive composition according to the present application uses a (meth)acrylate resin, and uses an epoxy-based crosslinking agent that can be cured with an acrylic acid, as a crosslinking agent. When an isocyanate-based crosslinking agent is used, rather than the epoxy-based crosslinking agent according to the present invention, crosslinking efficiency is very poor because curing does not occur efficiently with an acid of the (meth)acrylate resin.

In the present specification, the glass transition temperature is a value obtained by plotting endothermic and calorific values of a material as a function of temperature depending on phase change using a differential scanning calorimeter (DSC, Mettler, Inc.) when sealing a dedicated pen with about 10 mg of a sample and heating the same in an environment having a constantly elevated temperature.

Specifically, the glass transition temperature is a nominal value described in the literature, catalogs, and the like or a value calculated based on the following general formula (1) (Fox formula).

$$1/Tg = W1/Tg1 + W2/Tg2 + \ldots + Wn/Tgn \quad \text{[General Formula 1]}$$

wherein Tg is a glass transition temperature (unit K) of polymer A, Tgi (in which i is 1, 2, . . . n) is a glass transition temperature (unit: K) when monomer i forms a homopolymer, and Wi (in which i is 1, 2, . . . n) is a mass fraction in all of the monomer components of monomer i.

General Formula 1 is a calculation formula when polymer A comprises n kinds of monomer components comprising monomer 1, monomer 2, . . . , monomer n.

In one embodiment of the present application, provided is an adhesive composition wherein the metal salt is present in an amount of 1 part by weight or more and 10 parts by weight or less based on 100 parts by weight of the (meth)acrylate resin.

In another embodiment, the metal salt is present in an amount of 1 part by weight or more and 10 parts by weight or less, preferably 2 parts by weight or more and 10 parts by weight or less, and more preferably 2.5 parts by weight or more and 8 parts by weight or less, based on 100 parts by weight of the (meth)acrylate resin.

In one embodiment of the present application, provided is an adhesive composition wherein the acetylacetone is present in an amount of 0.1 parts by weight or more and 10 parts by weight or less based on 100 parts by weight of the (meth)acrylate resin.

In another embodiment, the acetylacetone may be present in an amount of 0.1 parts by weight or more and 10 parts by weight or less, preferably 0.3 parts by weight or more and 8 parts by weight or less, and more preferably 0.4 parts by weight or more and 5 parts by weight or less, based on 100 parts by weight of the (meth)acrylate resin.

The adhesive composition according to one embodiment of the present application comprises acetylacetone having a greater interaction with metal ions than epoxy used as a crosslinking agent, thereby preventing the decrease in the extent of curing of the adhesive layer. Since the metal salt and the acetylacetone are present in amounts of the corresponding parts by weight, they are capable of screening metal ions effectively and thereby preventing deterioration in the acid-epoxy crosslinking reaction and thus reduction of the extent of curing.

In particular, since the metal salt is present in an amount of parts by weight within the range described above, the permittivity of the adhesive layer can be increased to the desired extent and problems such as precipitation can be prevented. Since the acetylacetone is present in an amount of parts by weight within the range described above, it can sufficiently function to screen the metal salt, and provides excellent characteristics during drying due to the appropriate boiling point thereof.

In one embodiment of the present application, provided is an adhesive composition wherein the metal salt is $Li^+X^-$, wherein $X^-$ is represented by the following Formula 3:

$$[L(YO_mRf)_n]^- \quad \text{[Formula 3]}$$

wherein, in Formula 3, wherein L is a nitrogen atom or a carbon atom;

Y is a carbon atom or a sulfur atom;

Rf is a perfluoroalkyl group;

m is an integer of 1 or 2; and n is an integer of 2 or 3.

In particular, when the adhesive composition according to the present application comprises the metal salt of Formula 3, having a good dissociation rate, it has high conductivity and thus can realize higher relative permittivity than conventional cases even when a small amount of the metal salt is added.

In one embodiment of the present application, when Y in Formula 3 is carbon, m may be 1.

In one embodiment of the present application, when Y in Formula 3 is sulfur, m may be 2.

In one embodiment of the present application, when L in Formula 3 is nitrogen, n may be 2.

In one embodiment of the present application, when L in Formula 3 is carbon, n may be 3.

In one embodiment of the present application, the (meth)acrylate resin may comprise a (meth)acrylate resin having a weight average molecular weight of 400,000 g/mol to 2,000,000 g/mol.

The weight average molecular weight refers to an average molecular weight, the molecular weight of which is not uniform and that uses the molecular weight of a certain polymeric material as a reference, and is a value obtained by averaging the molecular weight of component molecular species of a polymeric compound having a molecular weight distribution as a weight fraction.

The weight average molecular weight can be measured through gel permeation chromatography (GPC) analysis.

In the present specification, (meth)acrylate is intended to comprise both acrylate and methacrylate. The (meth)acrylate resin may be, for example, a copolymer of a (meth)acrylic acid ester monomer and a crosslinkable functional-group-containing monomer.

The (meth)acrylic acid ester monomer is not specifically limited, but is, for example, alkyl (meth)acrylate, and more specifically, may comprise, as a monomer having a C1-C12 alkyl group, at least one of pentyl (meth)acrylate, n-butyl (meth)acrylate, ethyl (meth)acrylate, methyl (meth)acrylate, hexyl (meth)acrylate, n-octyl (meth)acrylate, isooctyl (meth)acrylate, 2-ethyl hexyl (meth)acrylate, dodecyl (meth)acrylate and decyl(meth)acrylate.

The crosslinkable functional-group-containing monomer is not particularly limited, but may, for example, comprise at least one of a hydroxyl-group-containing monomer, a carboxyl-group-containing monomer and a nitrogen-containing monomer.

Examples of the hydroxyl-group-containing compound comprise 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate and the like.

Examples of the carboxyl-group-containing compound comprise (meth)acrylic acid, 2-(meth)acryloyloxy acetic acid, 3-(meth) acryloyloxy propanoic acid, 4-(meth)acryloyloxy butyric acid, acrylic acid dimers, itaconic acid, maleic acid, maleic anhydride and the like.

Examples of the nitrogen-containing monomer comprise (meth)acrylonitrile, N-vinyl pyrrolidone, N-vinyl caprolactam, and the like.

At least one of vinyl acetate, styrene and acrylonitrile may be further copolymerized with the (meth)acrylate resin in view of other functionalities such as compatibility.

In one embodiment of the present application, the (meth)acrylate resin may comprise ethylhexyl acrylate (EHA) and acrylic acid (AA).

In one embodiment of the present application, provided is an adhesive composition wherein the adhesive composition further comprises one or more selected from the group consisting of a solvent, a dispersant, a crosslinkable compound, a photoinitiator, a thermal initiator, a tackifier and a silane coupling agent.

In particular, the silane coupling agent can be used to ensure the heat-resistance reliability of the adhesive sheet.

According to one embodiment of the present application, the crosslinkable compound may comprise at least one selected from the group consisting of: compounds obtained by esterifying polyhydric alcohols such as hexanediol di(meth)acrylate, ethylene glycol di(meth)acrylate, polyethylene glycol di(meth)acrylate having 2 to 14 ethylene groups, trimethylolpropane di(meth)acrylate, trimethylolpropane tri(meth)acrylate, pentaerythritol tri(meth)acrylate, pentaerythritol tetra(meth)acrylate, 2-trisacryloyloxymethylethylphthalic acid, propylene glycol di(meth)acrylate having 2 to 14 propylene groups, dipentaerythritol penta(meth)acrylate, dipentaerythritol hexa(meth)acrylate, or a mixture of an acid-modified product of dipentaerythritol penta(meth)acrylate and dipentaerythritol hexa(meth)acrylate (commercially available from Toagosei Co., Ltd., Japan, under the trade names of TO-2348 and TO-2349) with α,β-unsaturated carboxylic acid; compounds obtained by adding (meth)acrylic acid to glycidyl-group-containing compounds such as trimethylolpropane triglycidyl ether acrylic acid adducts and bisphenol A diglycidyl ether acrylic acid adducts; ester compounds of compounds having hydroxyl groups or ethylenically unsaturated bonds, such as diester phthalate of β-hydroxyethyl (meth)acrylate and toluene diisocyanate adducts of β-hydroxyethyl (meth)acrylate, with polycarboxylic acid, or their adducts with polyisocyanate; (meth)acrylate alkyl ester such as methyl(meth)acrylate, ethyl (meth)acrylate, butyl(meth)acrylate, and 2-ethylhexyl(meth)acrylate; and 9,9'-bis[4-(2-acryloyloxyethoxy) phenyl] fluorene, but is not limited thereto. General compounds known in the technical field to which the present disclosure pertains may be used.

In one embodiment of the present specification, the photoinitiator may be substituted with one or more substituents selected from the group consisting of a triazine-based compound, a biimidazole-based compound, an acetophenone-based compound, an O-acyloxime-based compound, a thioxanthone-based compounds, a phosphine-oxide-based compound, a coumarin-based compound and a benzophenone-based compound.

Specifically, in one embodiment of the present specification, the photoinitiator may comprise one or a mixture of two or more selected from a triazine-based compound such as 2,4-trichloromethyl(4'-methoxyphenyl)-6-triazine, 2,4-trichloromethyl-(4'-methoxystyryl)-6-triazine, 2,4-trichloromethyl(fipronil)-6-triazine, 2,4-trichloromethyl-(3',4'-dimethoxyphenyl)-6-triazine, 3-{4-[2,4-bis(trichloromethyl)-s-triazin-6-yl]phenylthio} propanoic acid, 2,4-trichloromethyl(4'-ethylbiphenyl)-6-triazine or 2,4-trichloromethyl-(4'-methylbiphenyl)-6-triazine; a biimidazole-based compound such as 2,2'-bis(2-chlorophenyl)-4,4',5,5'-tetraphenylbiimidazole or 2,2'-bis(2,3-dichlorophenyl)-4,4',5,5'-tetraphenylbiimidazole; an acetophenone-based compound such as 2-hydroxy-2-methyl-1-phenylpropan-1-one, 1-(4-isopropylphenyl)-2-hydroxy-2-methylpropan-1-one, 4-(2-hydroxyethoxy)-phenyl(2-hydroxy)propyl ketone, 1-hydroxycyclohexyl phenyl ketone, 2,2-dimethoxy-2-phenyl acetophenone, 2-methyl(4-methylthiophenyl)-2-morpholino-1-propan-1-one (Irgacure-907) or 2-benzyl-2-dimethylamino-1-(4-morpholinophenyl)-butan-1-one (Irgacure-369); an O-acyloxime-based compound such as Irgacure OXE 01 or Irgacure OXE 02 produced by Ciba Geigy Co., Ltd.; a benzophenone-based compound such as 4,4'-bis(dimethylamino)benzophenone or 4,4'-bis(diethylamino)benzophenone; a thioxanthone-based compound such as 2,4-diethyl thioxanthone, 2-chlorothioxantone, isopropyl thioxanthone or diisopropyl thioxanthone; a phosphine-oxide-based compound such as 2,4,6-trimethylbenzoyl diphenyl phosphine oxide, bis(2,6-dimethoxybenzoyl)-2,4,4-trimethylpentyl phosphine oxide or bis(2,6-dichlorobenzoyl) propyl phosphine oxide; and a coumarin-based compound such as 3,3'-carbonylvinyl-7-(diethylamino)coumarin, 3-(2-benzothiazolyl)-7-(diethylamino)coumarin, 3-benzoyl-7-(diethylamino)coumarin, 3-benzoyl-7-methoxy-coumarin or 10,10'-carbonylbis[1,1,7,7-tetramethyl-2,3,6,7-tetrahydro-1H,5H,11H—Cl]-benzopyrano[6,7,8-ij]-quinolizin-11-one, but is not limited thereto.

Also, the photoinitiator may be selected from those well-known in the art.

In one embodiment of the present application, the (meth)acrylate resin included in the adhesive composition may be a (meth)acrylate resin having a glass transition temperature (Tg) of −70° C. or less.

In another embodiment, the (meth)acrylate resin included in the adhesive composition has a glass transition temperature (Tg) of −70° C. or less, preferably −75° C. or less, and more preferably −80° C. or less.

In another embodiment, the (meth)acrylate resin included in the adhesive composition has a glass transition temperature (Tg) of −100° C. or higher, preferably −95° C. or higher, and more preferably −90° C. or higher.

The solvent may be any generally used organic solvent, may be a polar aprotic solvent, and specifically may be methyl ethyl ketone, toluene or ethyl acetate.

Another embodiment of the present application provides an adhesive layer comprising the adhesive composition according to the present application or a cured product thereof, wherein the adhesive layer has a storage modulus satisfying the following Equations 1 and 2:

$$1\times10^5 \leq G1' \leq 1\times10^6 \qquad \text{[Equation 1]}$$

$$1\times10^4 \leq G2' \leq 1\times10^5 \qquad \text{[Equation 2]}$$

wherein G1' is a storage modulus (Pa) at −30° C.; and G2' is a storage modulus (Pa) at 60° C.

The adhesive layer according to another embodiment of the present application exhibits increased internal ionic conductivity and thus increased permittivity by adding a metal salt to an adhesive layer having a reduced modulus in order to realize folding characteristics without causing damage to a display.

Also, the adhesive composition according to one embodiment of the present application comprises acetylacetone having a greater interaction with metal ions than epoxy, thereby preventing the decrease in the extent of curing of the adhesive layer and improving storage stability when stored as a mixture comprising the adhesive composition.

In one embodiment of the present application, Equation 1 may satisfy $1\times10^5 \leq G1' \leq 1\times10^6$, preferably $1.5\times10^5 \leq G1' \leq 0.5\times10^6$, and more preferably $1.7\times10^5 \leq G1' \leq 0.5\times10^6$.

In one embodiment of the present application, Equation 2 may satisfy $1\times10^4 \leq G2' 1\times10^5$, preferably $1.5\times10^4 \leq G2' \leq 0.1\times10^5$, and more preferably $2\times10^4 \leq G1' \leq 0.1\times10^5$.

In one embodiment of the present application, since the adhesive layer satisfies the ranges of Equation 1 and Equation 2, when applied to foldable displays in the future, folding stability can be maintained, which means that rheological behavior is satisfied within a temperature reliability range and temperature reliability may be from −20° C. to 60° C.

In one embodiment of the present application, provided is an adhesive layer wherein the adhesive layer has a relative permittivity of 4 or more at 25° C., 60 RH % and 100 KHz.

The adhesive layer according to the present disclosure is capable of increasing permittivity while maintaining the adhesive and folding properties of the adhesive agent used in conventional foldable displays, thus enabling high resolution and touch with a rapid response in a TOE-type structure.

The relative permittivity ($\varepsilon_r$) may be determined by measuring the capacitance Cp using an impedance gain-phase analyzer and calculating a permittivity (Dk), represented by the following Equation 4:

$$\varepsilon_r (\text{permittivity} D_k) = (C_p h/A) \times (1/\varepsilon_0)(\varepsilon_0 = 8.854\times10^{-12} F/m)$$ [Equation 4]

In one embodiment of the present application, the adhesive layer may have a permittivity of 4 or more, preferably 4.1 or more, and more preferably 4.2 or more at 25° C., 60 RH %, and 100 KHz.

In one embodiment of the present application, the adhesive layer may have a permittivity of 10 or less, preferably 9 or less, and more preferably 8 or less at 25° C., 60 RH % and 100 KHz.

In one embodiment of the present application, the adhesive layer may have a gel fraction of 50% or more.

In another embodiment of the present application, the adhesive layer may have a gel fraction of 50% or more, preferably 55% or more, and more preferably 60% or more.

In another embodiment, the adhesive layer may have a gel fraction of 90% or less, preferably 85% or less, and more preferably 80% or less.

In another embodiment, the gel fraction of the adhesive layer may be 50% or more and 90% or less, preferably 55% or more and 85% or less, and more preferably 60% or more and 80% or less.

The gel fraction can be measured by sampling about 0.5 g of the adhesive composition (A), immersing the adhesive composition (A) in about 100 ml of methyl ethyl ketone (MEK) for 1 day, and then filtering the same through a net with a 200 mesh (pore size of 74 μm) and comparing the weight of an insoluble fraction (B) of the adhesive composition not passed through the net.

The gel fraction is a value determined depending on the content of acetylacetone of the adhesive composition, and the gel fraction range can prevent lifting when subsequently applied to a foldable display and deformation of the adhesive agent.

The adhesive layer according to the present application increases permittivity and enables a high-resolution and quick-response touch in a TOE structure.

In one embodiment of the present application, the adhesive layer may have a thickness of 10 μm or more and 50 μm or less.

In another embodiment, the adhesive layer may have a thickness of 10 μm or more and 50 μm or less, preferably 15 μm or more and 45 μm or less, and more preferably 20 μm or more and 40 μm or less.

When the thickness of the adhesive layer satisfies the above range, the adhesive layer does not cause a phenomenon of lifting from the foldable display even after repeated folding and unfolding, when the adhesive layer is later attached to a foldable display.

In one embodiment of the present application, provided is an adhesive layer, wherein the adhesive layer has an adhesive force of 500 gf/inch or more after bonding one surface of the adhesive layer to the SUS304 substrate and then storing the resulting structure at 23° C. and 50 RH % for one day.

The adhesive force means an adhesive force after bonding one surface of the adhesive layer to the SUS304 substrate and storing the resulting structure at 23° C. and 50 RH % for one day. The adhesive force is measured at an angle of 180° and a peeling speed of 2,400 mm/min using a texture analyzer (Stable Micro Systems Co., Ltd.) after attaching the adhesive layer prepared according to the present disclosure to stainless steel (a SUS304 mirror substrate) by reciprocating a 2 kg rubber roller thereon one time.

In one embodiment of the present application, the adhesive force may be 500 gf/inch or more, preferably 510 gf/inch or more, and more preferably 530 gf/inch or more, after bonding one surface of the adhesive layer to the SUS304 substrate and then storing the resulting structure at 23° C. and 50 RH % for one day.

In one embodiment of the present application, the adhesive force may be 2,000 gf/inch or less, preferably 1,800 gf/inch or less, and more preferably 1,500 gf/inch or less, after bonding one surface of the adhesive layer to the SUS304 substrate and then storing the resulting structure at 23° C. and 50 RH % for one day.

Since the adhesive layer according to the present application has adhesive force in the above range, when the adhesive layer is subsequently attached to the foldable display, the phenomenon of lifting from the foldable display does not occur and excellent adhesive force can be obtained even upon repeated folding and unfolding several times.

In one embodiment of the present application, the adhesive layer further comprises a release film on at least one surface of the adhesive layer.

In another embodiment, the adhesive layer further comprises a release film on one surface of the adhesive layer.

In another embodiment, the adhesive layer comprises a release film on one surface of the adhesive layer and further comprises a release film on a surface opposite to the surface of the adhesive layer contacting the release film.

FIG. 1 is a side view showing a laminate structure of the adhesive layer according to an embodiment of the present application. Specifically, FIG. 1 shows the structure in which a release film 101 is provided on one surface of an adhesive layer 102 and another release film 103 is laminated on another surface of the adhesive layer 102.

When the adhesive layer is applied to the foldable display, the release film may be removed.

The release film may be a hydrophobic film, may be a transparent layer attached to one surface of an adhesive layer to protect the adhesive layer having a very thin thickness, and may be a film having excellent mechanical strength, thermal stability, moisture-blocking property and isotropy. For example, the release film may be an acetate (such as triacetyl cellulose, TAC), polyester, polyether sulfone, polycarbonate, polyamide, polyimide, polyolefin, cycloolefin, polyurethane or acrylic resin film or the like. Any commercially available silicon-treated release film may be used without limitation.

In one embodiment of the present application, a plurality of adhesive layers comprising the adhesive layer may be laminated.

In the present application, the adhesive layer may be prepared by applying the adhesive composition onto the release film with a bar coater.

Another embodiment of the present application provides a foldable display comprising: the adhesive layer according to the present application; and a flexible substrate provided on one surface of the adhesive layer.

The flexible substrate may be selected from the group consisting of TPU, glass, polyethylene terephthalate (PET), polyester, polycarbonate (PC), polyimide (PI), polyethylene naphthalate (PEN), polyether ether ketone (PEEK), polyarylate (PAR), polycyclic olefin (PCD), polynorbornene, polyethersulfone (PES) and a cycloolefin polymer (COP).

The foldable display according to the present application comprises the adhesive layer according to the present application, thus maintaining the adhesive property even after being folded multiple times and increasing permittivity, thereby providing a high-resolution and quick-response touch in a TOE structure.

Hereinafter, specific examples of the present invention will be described in more detail such that those skilled in the art to which the present invention pertains can easily implement the examples.

However, the present invention can be implemented in various forms and is not limited to the examples described herein.

Preparation Example 1-1. Preparation of Copolymer A

A monomer mixture containing 98 parts by weight of ethylhexyl acrylate (EHA) and 2 parts by weight of acrylic acid (AA) was added to a 1 L reactor, in which nitrogen gas was refluxed and in which a cooler was installed to facilitate temperature control, and then ethyl acetate (EAc) was added thereto as a solvent. Then, nitrogen gas was purged for about 1 hour to remove oxygen, and then the reactor temperature was maintained at 62° C. The mixture was homogenized, 400 ppm of azobisisobutyronitrile (AIBN) as a reaction initiator and 400 ppm of n-dodecylmercaptan (n-DDM) as a chain transfer agent were added thereto, and the resulting mixture was allowed to react. After the reaction, EAc was diluted to prepare a copolymer having a weight average molecular weight of 2,000,000 g/mol.

1-2. Preparation of Copolymer B

A monomer mixture containing 97 parts by weight of butyl acrylate (BA), 2 parts by weight of hydroxyethyl acrylate (HEA) and 1 part by weight of acrylic acid (AA) was added to a 1 L reactor, in which nitrogen gas was refluxed and in which a cooler was installed to facilitate temperature control, and then ethyl acetate (EAc) was added as a solvent thereto. Then, nitrogen gas was purged for about 1 hour to remove oxygen and then the reactor temperature was maintained at 62° C. The mixture was homogenized, 400 ppm of azobisisobutyronitrile (AIBN) as a reaction initiator and 400 ppm of n-dodecylmercaptan (n-DDM) as a chain transfer agent were added thereto, and the resulting mixture was allowed to react. After the reaction, EAc was diluted to prepare a copolymer having a weight average molecular weight of 2,000,000 g/mol.

2-1. Preparation of Adhesive Composition A

BXX-5240 as an epoxy-based crosslinking agent was added to 100 g of copolymer A prepared in Preparation Example 1-1, and a metal salt and acetylacetone were added thereto. A dilution to 18% by weight in ethyl acetate solution was added and homogeneously mixed.

2-2. Preparation of Adhesive Composition B

BXX-5240 as an epoxy-based crosslinking agent was added to 100 g of copolymer B prepared in Preparation Example 1-2, and a metal salt and acetylacetone were added thereto. A dilution to 18% by weight in ethyl acetate solution was added and homogeneously mixed.

3. Production of Adhesive Layer

The adhesive agent, polymerized in accordance with the designed composition was mixed with an ionic salt additive, diluted in a solvent to have a solid content to provide a viscosity (500 to 1,500 cp) suitable for coating, and then mixed for 15 minutes or longer using a mechanical stirrer. The mixture was allowed to stand at room temperature (25° C.) to remove the bubbles generated during mixing, and a coating film was formed using a blade and then dried at 140° C. for 3 minutes using a Mathis oven to prepare an adhesive layer.

The following Table 1 shows the adhesive compositions A and B prepared in Preparation Examples and the types and contents of the additives.

TABLE 1

|  | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Adhesive composition | Adhesive composition A | Adhesive composition A | Adhesive composition A | Adhesive composition A | Adhesive composition A | Adhesive composition A | Adhesive composition B |
| Glass transition temperature (Tg) | −83° C. | −83° C. | −83° C. | −83° C. | −83° C. | −83° C. | −53° C. |
| Type of additive | LiTFSI 3 pt Acac 0.5 pt | LiTFSI 5 pt Acac 0.5 pt |  | Acac 0.5 pt | LiTFSI 3 pt | LiTFSI 5 pt | LiTFSI 5 pt Acac 0.5 pt |

TABLE 1-continued

|  | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Storage modulus (G', Pa) @ −30° C. | $5.8 \times 10^5$ | $5.8 \times 10^5$ | $5.6 \times 10^5$ | $5.6 \times 10^5$ | $5.8 \times 10^5$ | $5.8 \times 10^5$ | $1.2 \times 10^6$ |
| Storage modulus (G', Pa) @ 60° C. | $2.8 \times 10^4$ | $2.5 \times 10^4$ | $2.8 \times 10^4$ | $2.8 \times 10^4$ | $2.7 \times 10^4$ | $2.4 \times 10^4$ | $9.6 \times 10^4$ |
| Relative permittivity (25° C., 60% RH, 100 KHz) | 4.37 | 5.28 | 3.64 | 3.63 | 4.41 | 5.24 | 5.07 |
| Adhesive force (gf/in) | 974.6 | 944.1 | 973.1 | 960.9 | 928.1 | 903.6 | 834.5 |
| Gel fraction (%) | 77.9% | 72.2% | 75.8% | 733% | 0.0% | 0.0% | 81.3% |
| Static folding (60° C., 90% RH, 2.5 R, 20 days) | OK | OK | OK | OK | NG | NG | OK |
| Dynamic folding (25° C. 2.5 R, 100,000 times) | OK | OK | OK | OK | OK | OK | NG |
| Thermal shock test (−20° C. 1 hr + 60° C. 1 hr, 240 cycles) | OK | OK | OK | OK | NG | NG | OK |

1. Adhesive Force

The adhesive force means an adhesive force after bonding one surface of the adhesive layer to a SUS304 substrate and storing the resulting structure at 23° C. and 50 RH % for one day. The adhesive force is measured at an angle of 180° and a peeling speed of 2,400 mm/min using a texture analyzer (Stable Micro Systems Co., Ltd.) after attaching the adhesive layer prepared according to the present disclosure to stainless steel (a SUS304 mirror substrate) by reciprocating a 2 kg rubber roller thereon one time.

2. Gel Fraction (%)

About 0.5 g of the adhesive composition (A) was sampled, the adhesive composition (A) was immersed in about 100 ml of methyl ethyl ketone (MEK) for 1 day, and was then filtered through a net with a 200 mesh (pore size of 74 μm), and the weight of an insoluble fraction (B) of the adhesive composition not passed through the net was then compared.

*Gel* content(wt %)=*B*/*A*×100

Cases where the gel content is 50% or more are designated as good.

3. Storage Modulus

The storage modulus was measured using an Advanced Rheometric Expansion System G2 (TA). The adhesive layer was repeatedly stacked and cut into a specimen having a thickness of 1 mm, and was then measured using a parallel plate fixture having a diameter of 8 mm. Measurement conditions: 1 Hz, 5% strain, 10° C./min.

4. Relative Permittivity

The capacitance (Cp) was measured using an impedance gain-phase analyzer, and a permittivity (Dk) was then calculated.

5. Static Folding Test

A specimen was produced in a 2 set stack-up structure, were folded in half, inserted into parallel plates having a 5 mm spacing therebetween and allowed to stand at 60° C. and 90% RH. After 20 days, the specimen was collected, and the degree of bubbling and the degree of lifting were visually observed.

In Table 1, cases where neither bubbling nor lifting occurred after the test were recorded as OK, and cases where bubbling and lifting were observed after the test were recorded as NG.

6. Dynamic Folding Test

A specimen was produced in a 2 set stack-up structure, and inserted into parallel plates having a 5 mm spacing therebetween, and a test of folding 100,000 times was performed at 25°. After the test, the specimen was collected, and the degree of bubbling and the degree of lifting were visually observed.

In Table 1, cases where neither bubbling nor lifting occurred were recorded as OK and cases where bubbling and lifting were observed were recorded as NG.

7. Thermal Shock Test

A specimen was produced in a 2 set stack-up structure, folded in half, inserted into parallel plates having a 5 mm spacing therebetween and allowed to stand at 20° C. for one hour and then at 60° C. for one hour. After 240 cycles (20 days), the specimen was collected, and the degree of bubbling and the degree of lifting were visually observed.

In Table 1, cases where neither bubbling nor lifting occurred were recorded as OK and cases where bubbling and lifting were observed were recorded as NG.

As can be seen from Table 1, the adhesive composition according to the present application comprises acetylacetone having a greater interaction with metal ions than epoxy, thereby preventing the decrease in the extent of curing of the adhesive layer and improving storage stability when stored as a mixture comprising the adhesive composition.

In particular, the adhesive layers of Examples 1 and 2 exhibit increased internal ionic conductivity and thus increased permittivity by adding a metal salt to an adhesive layer having a reduced modulus in order to realize folding characteristics without causing damage to a display. Accordingly, the adhesive and folding properties of the adhesive agent used in conventional foldable displays can be maintained, the permittivity can be increased, and a high resolution and a touch with quick response can thus be realized in a TOE-type structure.

That is, as can be seen from Examples 1 and 2 and Table 1, the adhesive composition according to the present application uses an acrylic copolymer resin, and uses an epoxy crosslinking agent that can be cured with an acrylic acid, as a crosslinking agent. However, when an isocyanate-based crosslinking agent is used, rather than the epoxy crosslinking agent according to the present invention, crosslinking efficiency is very poor because curing does not occur efficiently with acrylic acid.

As can be seen from Table 1, Comparative Examples 1 and 2 exhibit low relative permittivity since a metal salt is not contained in the adhesive composition, and Comparative Examples 3 and 4 exhibit a gel fraction of 0% because acetylacetone is not contained in the adhesive composition, and thus exhibit lifting and bubbling in the static folding test.

In addition, as can be seen from Table 1, Comparative Example 5 exhibits cracking in hard-coating (HQ of the set stack-up structure (hard-coating (HC)/PI substrate/hard-coating (HC)/adhesive layer/POL/adhesive layer/panel) after a dynamic folding test, since an acrylate resin having a higher Tg than those of Examples 1 and 2 is used for the adhesive composition.

The invention claimed is:

1. An adhesive composition comprising:
   a (meth)acrylate resin having a glass transition temperature (Tg) of −70° C. or lower;
   an epoxy crosslinking agent;
   a metal salt; and
   acetylacetone (acac),
   wherein the acetylacetone is contained in an amount of 0.1 parts by weight or more and 0.5 parts by weight or less based on 100 parts by weight of the (meth)acrylate resin,
   wherein the metal salt is contained in an amount of 3 parts by weight or more and 5 parts by weight or less based on 100 parts by weight of the (meth)acrylate resin, and
   wherein the metal salt is Li+X−,
   wherein X− is represented by the following Formula 3:

$[L(YOmRf)nl]-$  [Formula 3]

wherein, in the Formula 3,
   L is a nitrogen atom or a carbon atom;
   Y is a carbon atom or a sulfur atom;
   Rf is a perfluoroalkyl group;
   m is an integer of 1 or 2; and
   n is an integer of 2 or 3.

2. The adhesive composition according to claim 1, further comprising one or more selected from the group consisting of a solvent, a dispersant, a crosslinkable compound, a photoinitiator, a thermal initiator, a tackifier and a silane coupling agent.

3. An adhesive layer comprising the adhesive composition according to claim 1 or a cured product thereof,
   wherein the adhesive layer has a storage modulus satisfying the following Equations 1 and 2:

$1 \times 10^5 \leq G1' \leq 1 \times 10^6$  [Equation 1]

$1 \times 10^4 < G2' \leq 1 \times 10^5$  [Equation 2]

wherein G1' is a storage modulus (Pa) at −30° C.; and
   G2' is a storage modulus (Pa) at 60° C.

4. The adhesive layer according to claim 3, wherein the adhesive layer has a thickness of 10 μm or more and 50 μm or less.

5. The adhesive layer according to claim 3, wherein the adhesive layer has a relative permittivity of at least 4 at 25° C., 60 RH % and 100 KHz.

6. The adhesive layer according to claim 3, wherein the adhesive layer has an adhesive force of at least 500 gf/inch after bonding one surface of the adhesive layer to a SUS304 substrate and then storing a structure resulting therefrom at 23° C. and 50 RH % for one day.

7. The adhesive layer according to claim 3, wherein the adhesive layer has a gel fraction of at least 50%.

8. The adhesive layer according to claim 3, further comprising a release film on at least one surface of the adhesive layer.

9. A foldable display comprising:
   the adhesive layer according to claim 3; and
   a flexible substrate provided on one surface of the adhesive layer.

10. The foldable display according to claim 9, wherein the flexible substrate is selected from the group consisting of TPU, glass, polyethylene terephthalate (PET), polyester, polycarbonate (PC), polyimide (PI), polyethylene naphthalate (PEN), polyether ether ketone (PEEK), polyarylate (PAR), polycyclic olefin (PCO), polynorbornene, polyethersulfone (PES) and a cycloolefin polymer (COP).

* * * * *